United States Patent
Gjelseth et al.

(10) Patent No.: US 12,527,304 B2
(45) Date of Patent: Jan. 20, 2026

(54) CROWDING ARRANGEMENT

(71) Applicant: MMC First Process AS, Fosnavåg (NO)

(72) Inventors: Leif Roger Gjelseth, Fosnavag (NO); Helge Birkeland, Ulsteinvik (NO)

(73) Assignee: MMC First Process AS, Fosnavåg (NO)

( * ) Notice: Subject to any disclaimer, the term of this patent is extended or adjusted under 35 U.S.C. 154(b) by 0 days.

(21) Appl. No.: 18/844,436

(22) PCT Filed: Mar. 8, 2023

(86) PCT No.: PCT/NO2023/050052
§ 371 (c)(1),
(2) Date: Sep. 6, 2024

(87) PCT Pub. No.: WO2023/172144
PCT Pub. Date: Sep. 14, 2023

(65) Prior Publication Data
US 2025/0185634 A1    Jun. 12, 2025

(30) Foreign Application Priority Data
Mar. 8, 2022  (NO) .................................. 20220292

(51) Int. Cl.
*A01K 63/02*    (2006.01)

(52) U.S. Cl.
CPC .......... *A01K 63/02* (2013.01); *A01K 2227/40* (2013.01)

(58) Field of Classification Search
CPC ........ A01K 63/02; A01K 63/10; A01K 79/00; A01K 2227/40
(Continued)

(56) References Cited

U.S. PATENT DOCUMENTS

2012/0167829 A1  7/2012  Madsen et al.
2021/0112785 A1* 4/2021  Krogenes ............... A01K 61/65
(Continued)

FOREIGN PATENT DOCUMENTS

NO    324024       7/2007
NO    324024 B1 *  7/2007  ............. A01K 63/00
(Continued)

OTHER PUBLICATIONS

International Search Report, Sep. 14, 2023, PCT/NO2023/050052.
Written Opinion, Sep. 14, 2023, PCT/NO2023/050052.

*Primary Examiner* — Zoe Tam Tran
(74) *Attorney, Agent, or Firm* — Sand, Sebolt & Wernow Co., LPA (57) ABSTRACT

A crowding arrangement for an aquaculture tank of marine organism where the tank includes at least one outlet in a bottom of the tank. The crowding arrangement has a sheet extending between a hub and an outer ring. The sheet encircles the hub at the center of the tank. The sheet, hub, and outer ring cover a horizontal cross-sectional area of the tank. The crowding arrangement also has a first wiper assembly and either a second wiper assembly or a fixed wall extending substantially radially between the hub and the outer ring. The first wiper assembly is movably arranged with respect to the sheet and includes a crossbar and a wiper fixedly attached to one another and which are arranged in parallel to form a gap therebetween to receive the sheet and small enough to prevent marine organisms to pass through the gap.

12 Claims, 13 Drawing Sheets

(58) Field of Classification Search
USPC .......................................................... 119/201
See application file for complete search history.

(56) References Cited

U.S. PATENT DOCUMENTS

2022/0192162 A1* 6/2022 Gjelseth ................. A01K 61/95
2022/0408700 A1* 12/2022 Beck ...................... A01K 61/95

FOREIGN PATENT DOCUMENTS

| NO | 20201423 | 6/2022 |
| WO | 2009100503 | 8/2009 |
| WO | 2015099540 | 7/2015 |
| WO | 201103807 | 6/2019 |

* cited by examiner

CROWDING ARRANGEMENT

TECHNICAL FIELD

The invention relates to a crowding arrangement for an aquaculture tank of marine organism, and a method for crowding and prior to emptying the aquaculture tank using the crowding arrangement.

BACKGROUND ART

Reservoirs or tanks, such as breeding cages, cages, or similar devices, for breeding fish or other marine organisms, shall be emptied, for instance when the organisms have to be moved to a larger tank or pen. The handling for these movement needs to be performed gentle to not harm the marine organism.

At reception or intermediate storage facilities for other live fish, it is common for waiting cages to be arranged in which the fish is stored before it is slaughtered. The invention is however equally applicably for land-based aquafarming and closed net cage at sea.

NO324024 shows a prior art method and device for crowding and emptying a tank for aquaculture or intermediate storage of marine organisms. The crowding arrangement is made up by separate parts. There is a closing net or lid that is adapted to be lowered into the tank to restrict the area of the tank from the top. At the bottom of the tank there is provided a movable profile and fixed profile on opposite side of an outlet from the tank. The profiles are attached to the tank in this prior art solution. There is provided a restricted area between the profiles to collect and guide the fish out from the tank. However, the profiles are an integrated part of the tank, not the device. The closing lid is thus only used to restrict the area from the top of the tank. The closing lid is separately arranged from the profiles and must be made as a rigid construction to make sure that there is no gap between the profiles and the closing lid to avoid any escape of marine organisms between the profiles and the closing lid.

The crowding arrangement according to the invention provides a flexible and lightweight arrangement for the crowding process in a tank. The crowding arrangement according to the invention thus also provides a more efficient and easier handling of the crowding process than the prior art solutions.

The crowding arrangement according to the present invention, the sheet do not need to be made up by a rigid construction since the sheet and wiper assembly are formed as one arrangement where the sheet is fitting into a gap in the wiper assembly. This gap is small enough to make sure that the marine organism or fish do not move from one side to the other side of the gap. The gap is further large enough for the wiper assembly to move with respect to the sheet.

The sheet is tensioned between the outer and inner ring, and further mated with the wiper arrangement. This which makes it possible for the sheet to be more flexible and light-weighted.

Other relevant prior art regarding crowding arrangement includes US 2012/0167829 A1 which describes a floating circular fish pen with a buoyant elongated spar buoy in the middle of the fish pen. The fish pen includes a deployable panel system, deploying from the spar buoy towards the wall of the fish pen, for crowding fish into smaller portions of the fish pen.

Lastly, WO 2015/099540 A1, which is similar to US 2012/0167829 A1, also describing a circular fish pen for crowding fish, by means of fixed walls, and a rotatable wall about a center column for crowding fish in the fish pen and it also includes a moveable section of the floor in the fish pen for further crowding the fish.

SUMMARY OF INVENTION

The invention relates a crowding arrangement for an aquaculture tank of marine organism, the tank having at least one outlet in the bottom of the tank. The crowding arrangement comprises
  a sheet extending between an inner ring and an outer ring,
  a first wiper assembly and a second wiper assembly or alternatively, a first wiper assembly and a fixed wall, extending substantially radially between a hub and the outer ring; the first wiper assembly is moveably arranged with respect to the sheet,
  the first wiper assembly comprising a crossbar and a wiper, the crossbar and the wiper being arranged in parallel and that a gap is formed therebetween to receive the sheet, the wiper and the crossbar being fixedly attached to each other at one end.

The invention further relates to a method for crowding an aquaculture tank of marine organism, using the crowding arrangement according to the crowding arrangement of the invention. The method comprises the steps of rotating the first wiper assembly towards the second wiper assembly or the fixed wall to guide the marine organism towards an outlet in the tank positioned at the bottom of the tank, the outlet being positioned so that in all positions of the wiper assembly the outlet is arranged in the area between the second wiper assembly or the fixed wall (6), and the first wiper assembly.

Preferable embodiments of the arrangement are set out in the dependent claims, to which reference are made.

The driving mechanism may comprise a bar connected to the wiper assembly and is adapted to follow a track defined by inner and outer guide walls arranged in the outer ring.

The method may further comprise lowering the crowding arrangement by a suspension arrangement (not shown) prior to the crowding the tank and lifting the crowding arrangement away from the bottom of the tank and counter rotate the wiper arrangement towards the opposite side of the counterpart to reset the crowding arrangement by the suspension arrangement, after the crowding the tank.

BRIEF DESCRIPTION OF DRAWINGS

FIG. 1-FIG. 2*b* shows the crowding arrangement according to an embodiment of the invention, viewed from different angles.

DETAILED DESCRIPTION OF THE INVENTION

The term marine organisms may be interpreted as organism living in marine environment and that is suitable for farming. This may for instance be fish, shrimp, lobster, crab.

The tank may be for aquaculture or intermediate storage of marine organism. The tank may for instance be arranged on a well boat or a tank arranged on land. The tank is preferable circular or substantially circular. However other shapes or the tank may be possible.

Figure 1:
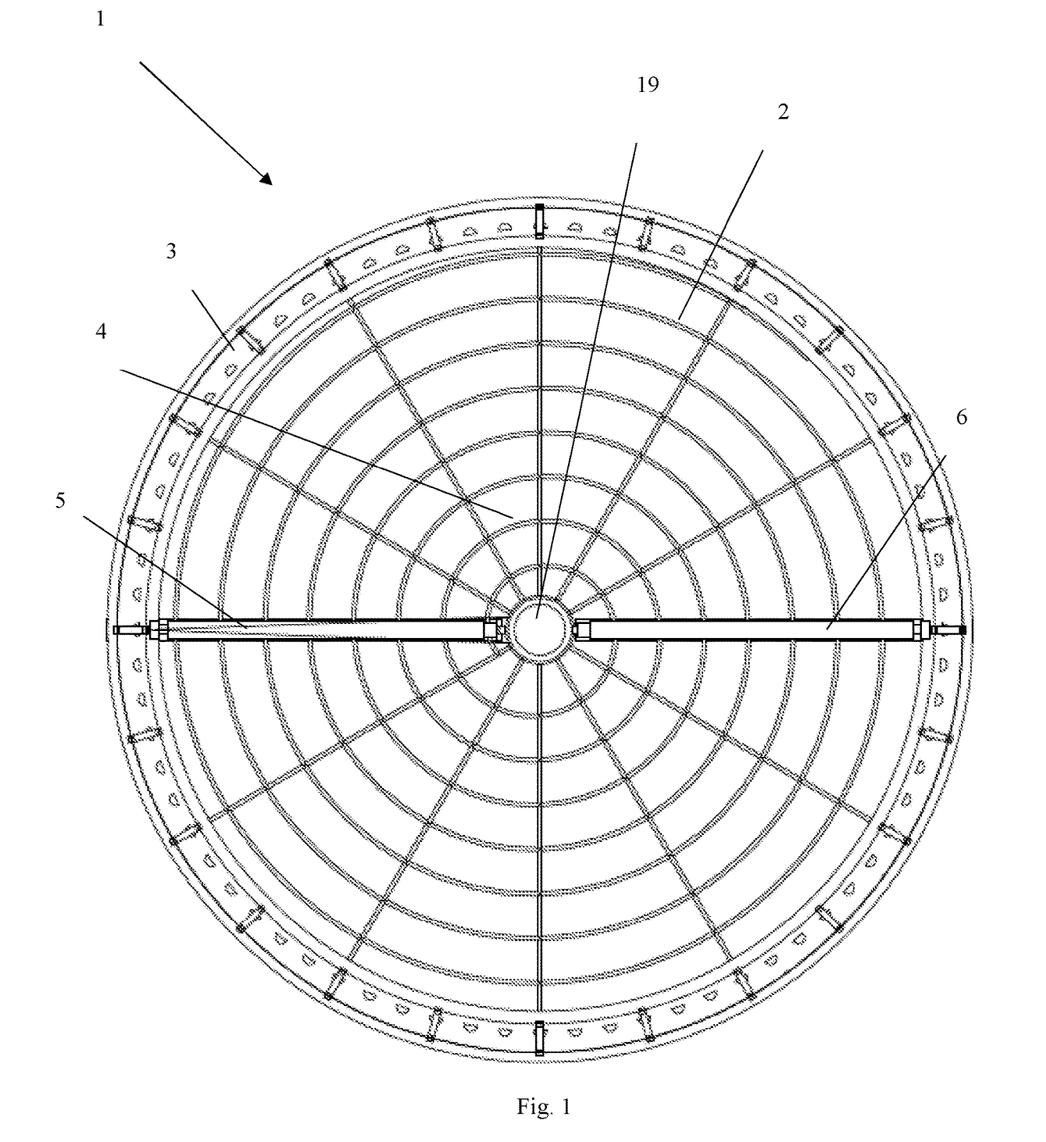
Figure 2A:
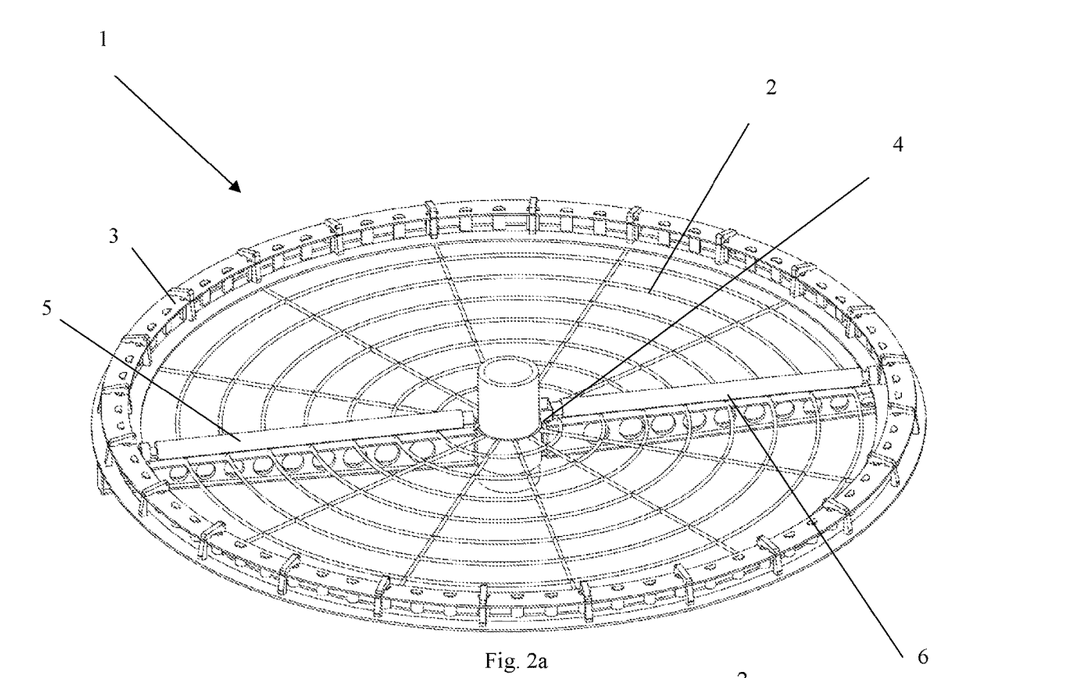
Figure 2B:
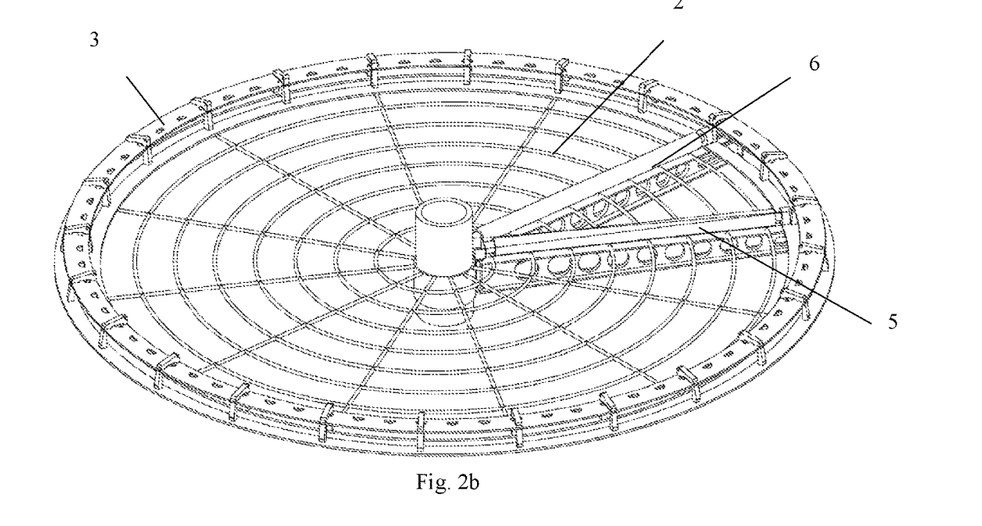

FIGS. 1 and 2 shows a crowding arrangement 1 for use in a tank that contains marine organisms, such as fish. The tank has at least one outlet for discharging water and marine organisms. The at least one outlet is arranged at the lower part of the tank, preferably in the bottom of the tank, in an outer side wall close to the bottom or in a side of a central column in the tank. The tank is not shown but is known per se, for instance from NO324024.

The arrangement in the example figures has having a substantially circular shape to match the circular side walls of the tank. The crowding arrangement 1 is thus adapted to be positioned within the tank.

FIG. 1 shows the crowding arrangement 1 from above. The crowding arrangement 1 comprises an outer ring 3 and a hub 5a. The outer ring 3 is adapted to contact with the inner wall surface 30 of the tank. The hub 5a may form a circular ring This hub 5a may surround a center column 19 or similar arrangement in the center of the tank as show in FIG. 3. The hub 5a may also be a ring-shaped center position of the crowding arrangement 1. In the latter case the ring forms the center position without any central column 19 or similar. When there is no central column the inner ring must be closed at the top to avoid that the marine organisms, such as the fish are able to escape. The hub 5a may also be defined as an end connection in a wiper arrangement 5 as will be disclosed further below.

FIG. 3-9 shows a first wiper assembly 5, and a second wiper assembly or a fixed wall 6 in further detail. The figures also shows a guide arrangement 9 and a driving mechanism 10.

Figure 3:
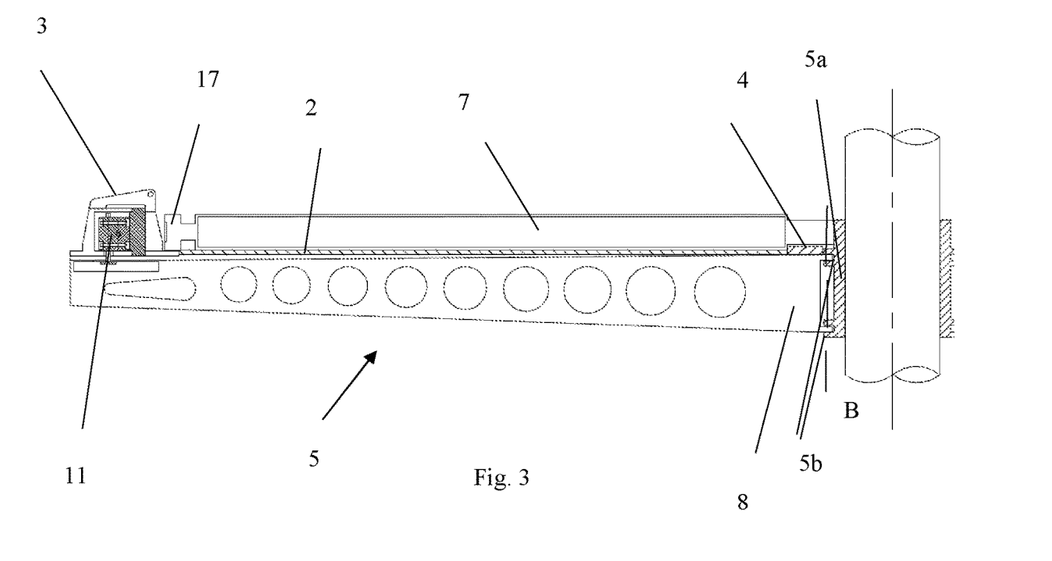
FIG. 3 shows a detailed side view of the first wiper assembly with the sheet arranged between the cross bar and the wiper.

As shown in FIG. 3, a sheet 2 is extending between the outer ring 3 and an inner ring 4. The sheet 2 is fixedly attached to, respectively, the inner ring 4 and the outer ring 3. The sheet 2 in other words tensioned between the outer ring 3 and inner ring 4. Optionally, the sheet 2 can be fixedly attached to the hub 5a itself, wherein the sheet 2 is tensioned between the hub 5a and the outer ring 3.

The sheet 2 may be perforated or form an impervious cover. It may be made of a netting, fabric, plastic sheet with slits/holes, or a tarpaulin. In the case of the sheet being impervious, there must be other ways where the water may pass to/from the crowding arrangement 1. It is to be noted that the sheet 2 is made as an continuously arranged cover or made of connected pieces. There are no openings between sheet parts as the FIGS. 12 and 13 may give an impression of.

The crowding arrangement 1 further comprises the first wiper assembly 5. The first wiper assembly 5 extends between a hub 5a and the outer ring 3 as shown in FIG. 3. The first wiper assembly 5 is adapted to rotate with respect to sheet 2. The first wiper assembly 5 comprises further a wiper 8 and a cross bar 7 that are connected to the hub 5a thus forms a connecting part between the cross bar 7 and the wiper 8 at the end with the inner ring 4. The wiper 8 and the cross bar 7 are arranged on opposite sides of the sheet 2. The wiper 8 and the crossbar 7 thus forms a slit or small gap where the sheet 2 able to be positioned. The slit or gap is small enough to prevent fish to cross the wiper assembly 5, but large enough for the sheet 2 to be positioned within the gap.

The slit or gap can have a predetermined space or distance between the wiper 8 and the cross bar 7 that can be adapted or changed depending on the size of the fish, or more specifically the diameter of the fish. The slit or gap can have a fixed or an adjustable distance between the wiper 8 and the cross bar 7 for preventing larger fish with a diameter, i.e. a thickness across its shortest axis, between 0.5 cm to 5.0 cm to pass through the slit or gap. Optionally, the slit or gap can have an adjustable distance for preventing younger fish, e.g. smolt, with a diameter between 0.2 cm to 2.0 cm to pass through the slit or gap. Furthermore, the slit or gap can have an adjustable distance for preventing crustaceans, e.g. shrimp, with a diameter between 0.1 cm to 0.5 cm to pass through the slit or gap.

By arranging the sheet 2 and the wiper assembly 5 in the same crowding arrangement 1, the sheet may be of a flexible and lighter material than with the prior art solutions to prevent the marine organism of fish to pass between the sheet and the wiper.

As mentioned above the hub 5a optionally also be a ring surrounding the central column, when present or a smaller center ring when there is no central column. These alternatives are however optionally as the hub 5a may be guided by the inner ring 4.

The first wiper assembly may be hingedly connected to the hub 5a, through hinged connections as indicated in FIG. 3. The wiper is moveable about and axis B shown in the figure.

The crowding arrangement 1 also comprises a second wiper assembly 6 or alternatively a fixed wall. Both alternatives are referred to as 6 in the figures. When there is a fixed wall, this wall may be fixedly arranged between the outer ring 3 and the hub 4. In this embodiment, the fixed wall 6 is thus retained at the same position in the crowding arrangement 1. When the crowding arrangement 1 is arranged in the tank, fixed wall 6 is arranged near the outlet of the tank. The fixed wall 6 is further extending downwardly from the crowding arrangement 1. This is further illustrated in FIG. 11. The fixed wall 6 thus provides a stopper and guide for the collected marine fish that is collected by the first wiper assembly 5. The fixed wall 6 thus facilitates the movement of the marine organisms towards the outlet. In this embodiment, the fixed wall 6 only needs a wall similar to the wiper 8 of the first wiper assembly 5 extending downwardly from the sheet 2.

In a further embodiment, there may be a second wiper assembly 6 replacing the fixed wall. The second wiper assembly 6 may be rotationally arranged in a similar way as the first wiper assembly 5. In this embodiment it is preferred that the second wiper assembly 6 has the same design as the first wiper assembly 5 with a cross bar 7 in addition to the wiper 8. Further embodiments of the invention may have more than two wiper assemblies similar to the first wiper assembly 5

Figure 4A:
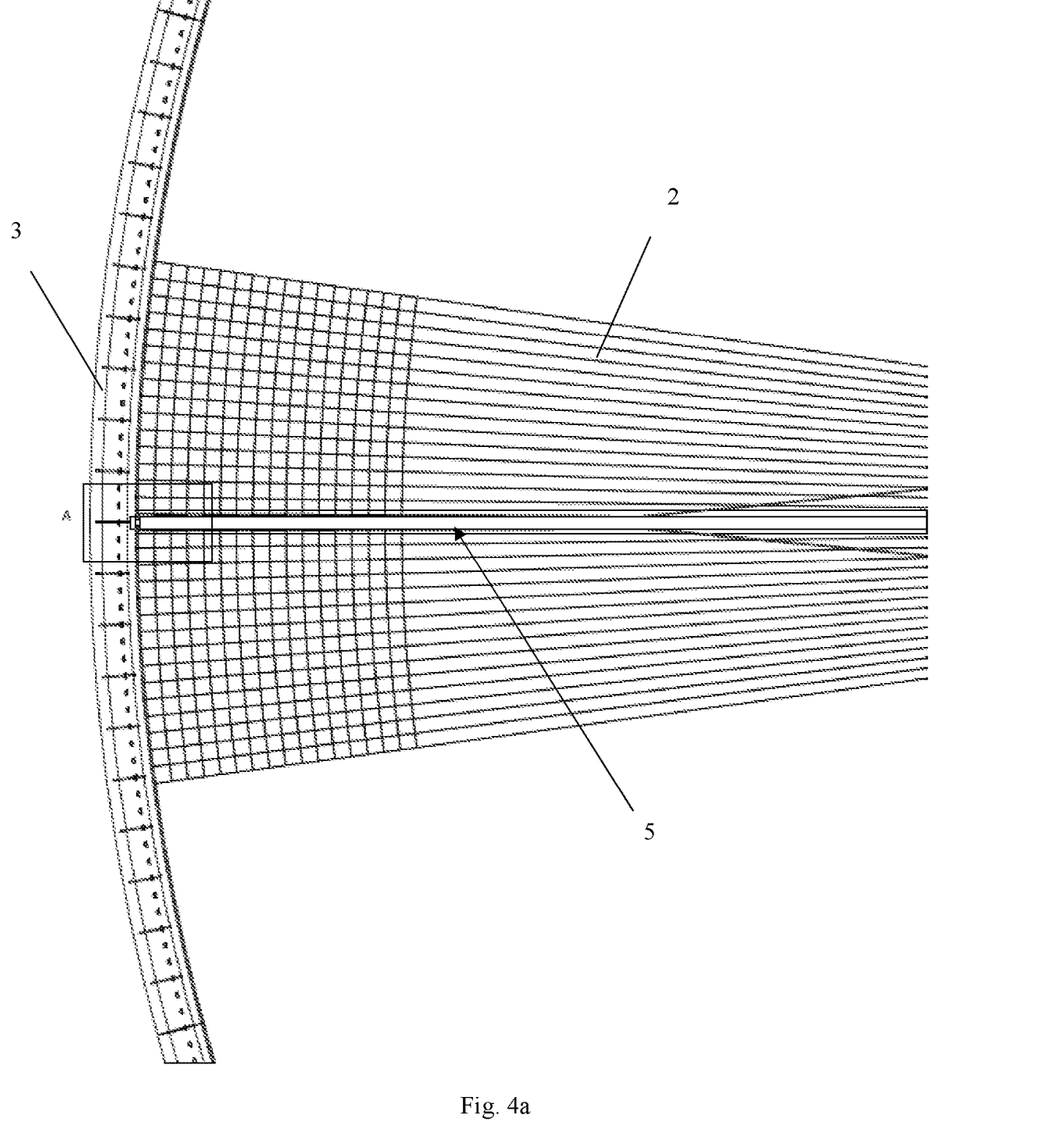
FIG. 4*a* shows a detailed partial view of the first wiper assembly and the outer ring, viewed from above.
Figure 4B:
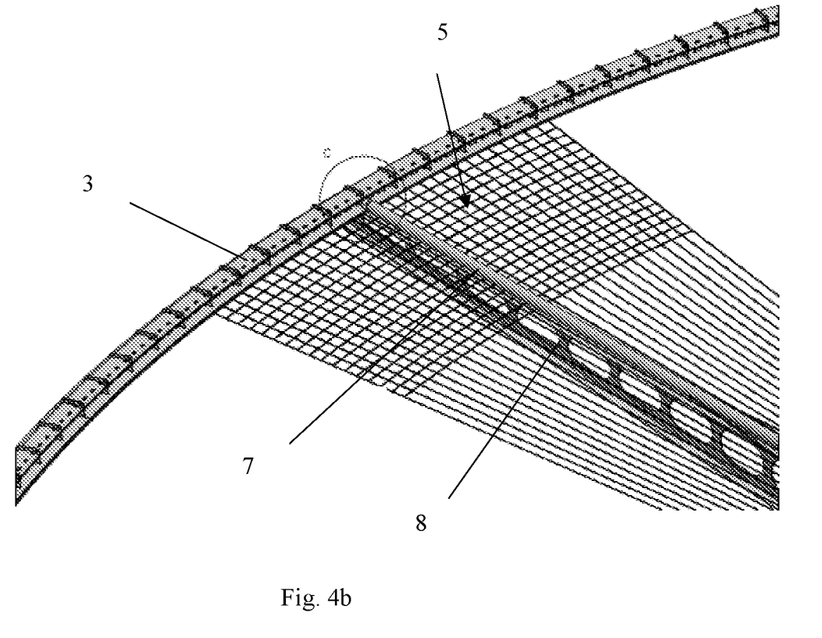
FIG. 4*b* shows a detailed partial view of the first wiper assembly and the outer ring in isometric view.
Figure 5:
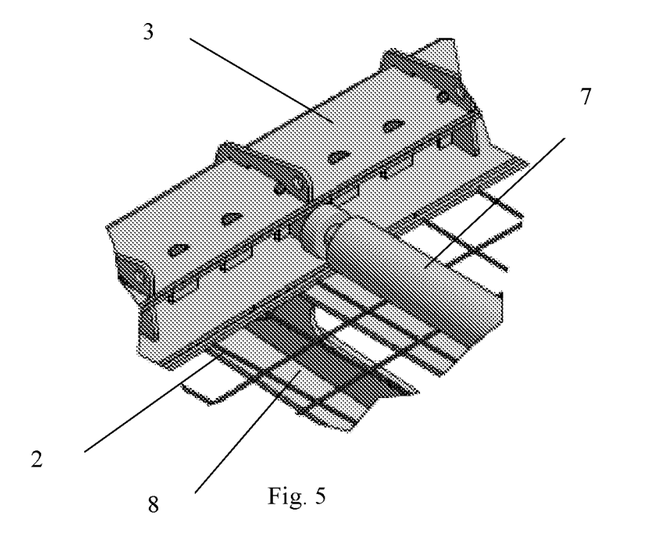
FIG. 5 shows a further detailed partial view of the arrangement of the first wiper assembly at the outer ring, FIG. 6

The first wiper assembly 5 comprises the wiper 8 as shown for instance in FIGS. 4a-4b and 5. The wiper 8 is arranged at the underside of the sheet 2. The wiper 8 having a bracket shape that is extending perpendicularly towards the bottom of the tank when the crowding arrangement 1 is installed in the tank. This provides a collective function when the first wiper assembly 5 being rotated so that all the marine organisms contained in the tank could be gathered in a space between the wiper 8 and the second wiper assembly or fixed wall 6. The wiper 8 may further have openings to allow marine organisms less than a defined size, such as cleaner fish, to remain in the tank. The same applies for the second wiper assembly 6.

The first wiper assembly 5 further comprises the crossbar 7 and may also comprise a cross bar roller 17. The crossbar roller 17 is attached at the free end of the cross bar 7. The cross bar 7 is further arranged at the top side of the sheet 2. This means that the sheet 2 is arranged between the cross bar 7 and the wiper 8 as already disclosed in FIG. 3.

The crossbar roller 17 at the end of the cross bar 7 is further arranged to bear against the outer ring 3 and is adapted to follow a sliding movement along the outer ring 3 when the first wiper assembly 5 is rotating.

The guiding arrangement 9 and the driving mechanism 10 are illustrated in detail in FIG. 6-9. Both the arrangement and mechanism are part of the outer ring 3.

The guiding arrangement 9 comprises an inner guide wall 13 and an outer guide wall 14. As illustrated in the FIG. 6 these guide walls are arranged a distance apart on the outer ring 3 forming a track 15a for the driving mechanism 10. In addition, the arrangement of the inner guide wall 13 and the outer guide wall 14 forms a slit 15a at the bottom of the track 15a as indicated in the FIG. 6. The slit 15b makes it possible for the first wiper assembly 5 to be connected to the driving mechanism 10 and to perform the movement of the first wiper assembly 5. This will be further described below.

The guiding arrangement 9 may further comprise a number of bar guides 16 arranged on the inner or outer guide wall 13, 14 to facilitate the sliding of the driving mechanism 10 in the track 15a. In the embodiment shown in the figures, there are arranged multiple bar guides 16 attached to the inner guide wall 13. The multiple bar guides 13 are in this embodiment evenly distributed along the periphery of the inner guide wall 13.

The guiding arrangement 9 may also comprise an outer ring second cover 3b arranged to cover the track 15a.

An embodiment of the driving mechanism 10 is also illustrated in detail in FIG. 6-9. The driving mechanism 10 comprises a bar 11. The bar 11 is adapted to be slidingly arranged in the track 15a of the guiding arrangement.

The driving mechanism 10 further comprises a pulling device 12. The pulling device 12 may for instance be a rope or wire that is further attached to an actuator, for instance a winch or similar. The movement may also be made manually, for instance on smaller tanks.

Figure 6:
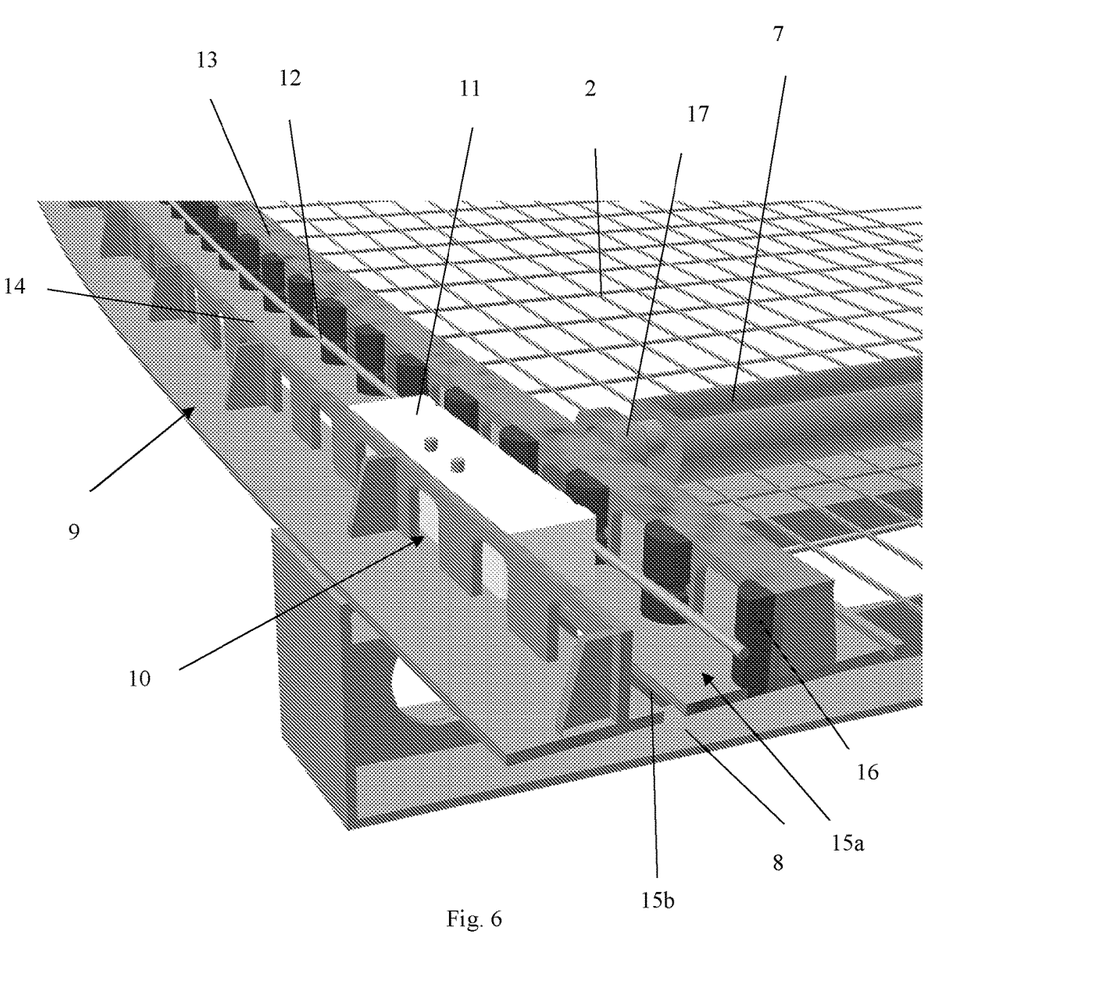

The rope 12 in FIG. 6 is arranged between two parts of the bar 11. The parts are connected and thus enclosing a part of the rope 12 within the bar 11. The connection between the bar parts may be performed by for instance bolt and screw in otherwise known manner. Outside of the bar 11, the rope 12 may extend along the bar guides 16, as indicated in the figures. Other arrangements of the bar 11 and the connection to the pulling device 12 may also be possible.

Figure 7:
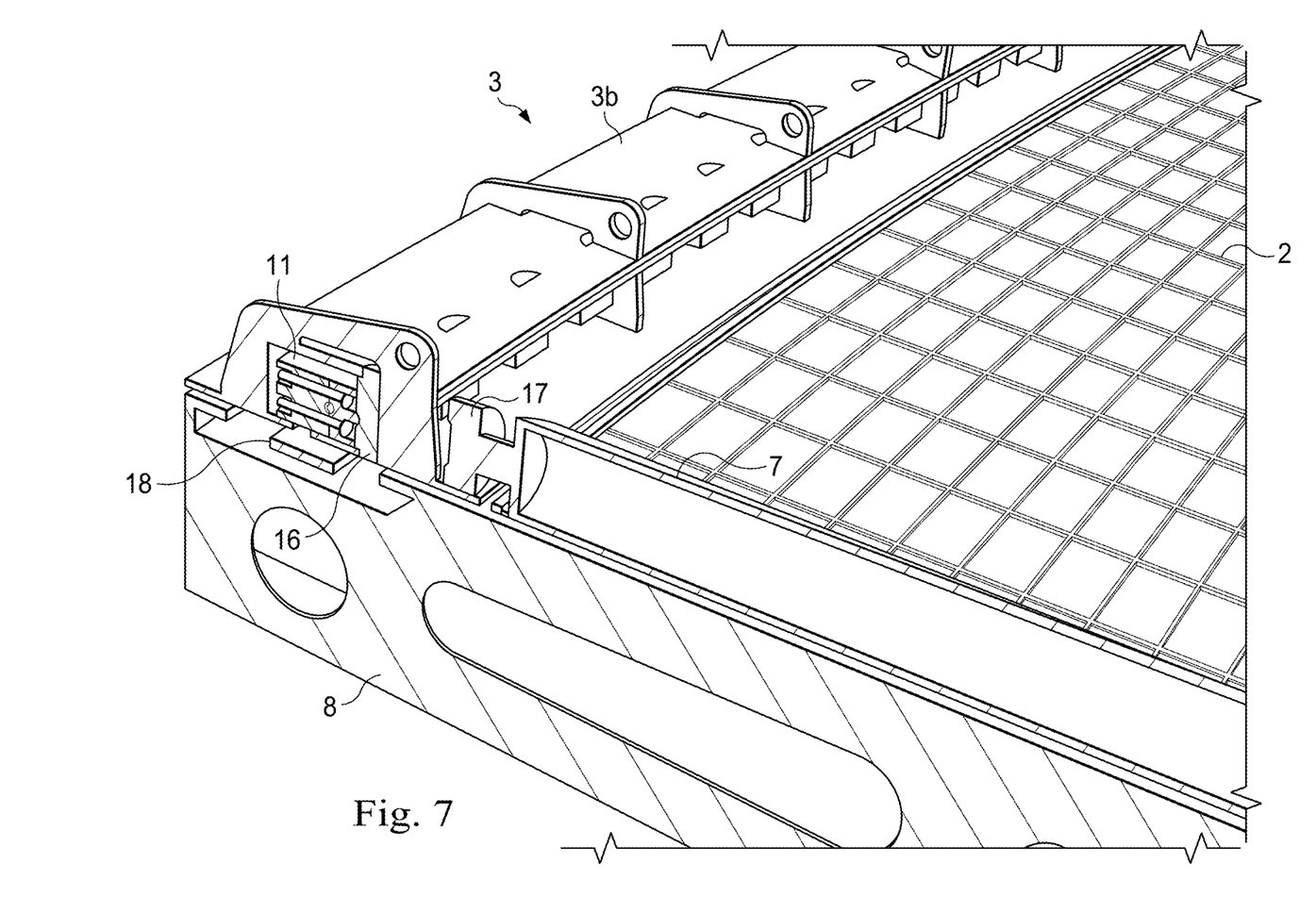
FIG. 7 shows a detailed partial view of the outer ring with the guide arrangement and driving mechanism, perspective viewed, FIG. 8
Figure 8:
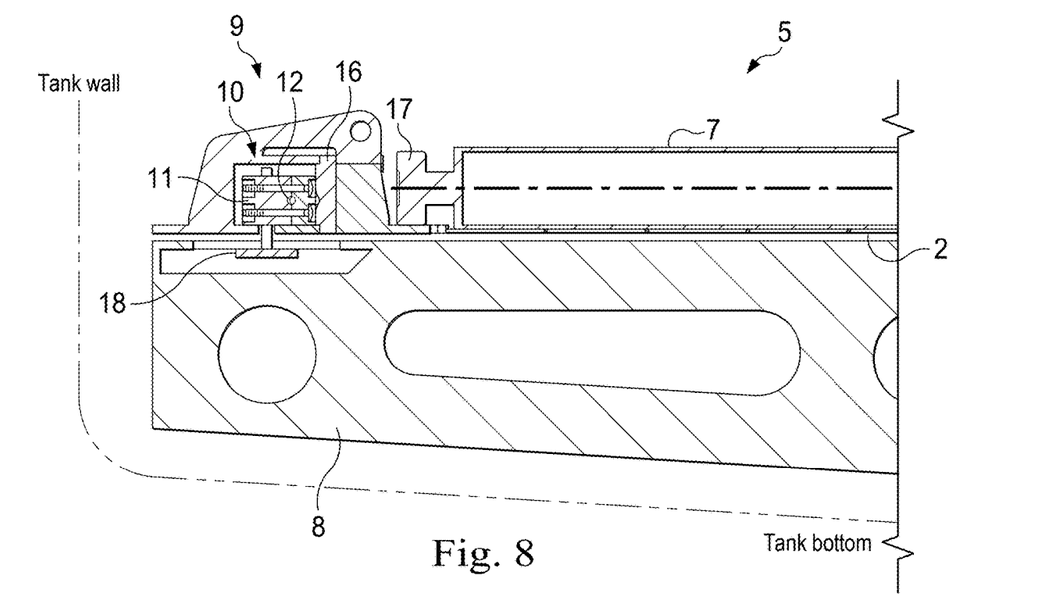
Figure 9:
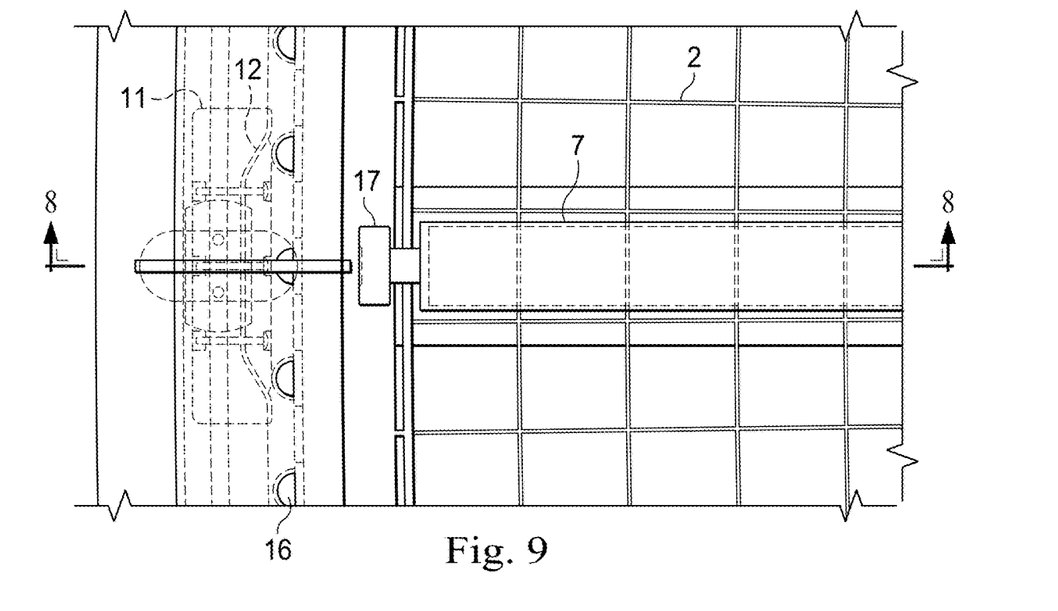
FIG. 9 shows further detailed partial view of the guide arrangement and driving mechanism viewed from the side and from above, respectively.

FIG. 7-8 further discloses a wiper block 18. The wiper block 18 provides a connection between the first wiper assembly 5 and the driving mechanism 10. The figures show that the wiper block 18 is fixedly attached to the wiper 8 at one side and fixedly attached to the bar 11 at the opposite side. The wiper block 18 is extending through the slit 15b since the wiper 8 is arranged beneath the outer ring 3.

Figure 10:
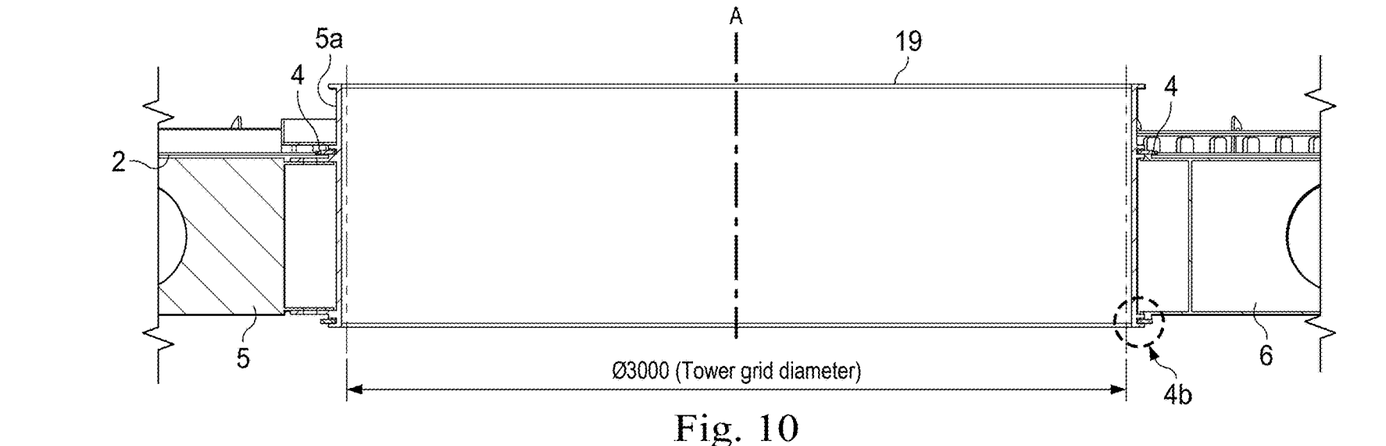
FIG. 10 shows a detail of the hub and its connection to the first wiper assembly, and the second wiper assembly or the fixed wall.
Figure 11:
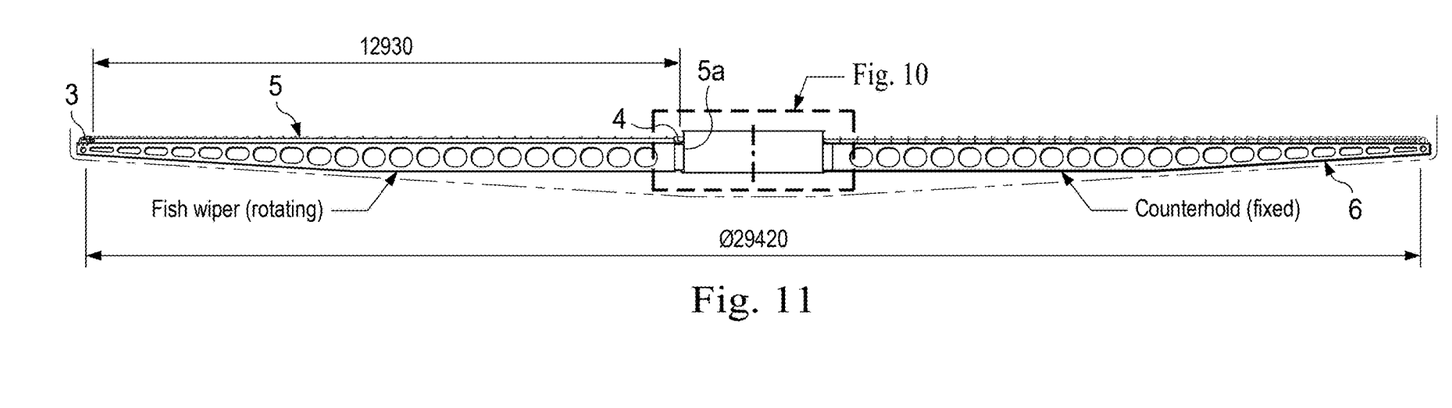
FIG. 11 shows the first wiper assembly, and the second wiper arrangement or fixed wall in a side view of the crowding arrangement.

FIGS. 10-11 shows a detailed view of the center part of the crowding arrangement 1. The hub 5 may have a ring shape and may be arranged outside of a central column or silo 19 as disclosed in FIG. 3. The silo or central column extends in the vertical direction when the crowding arrangement 1 is installed in the tank.

The first wiper assembly 5 is adapted to rotate with respect to the central column or silo 19. The rotational axis is the center axis A of the crowding arrangement 1 as shown in FIG. 10 The wiper assembly 5 is also adapted to rotate with respect to the sheet 2 and the outer ring 3.

FIG. 11 shows a suitable design of the fixed wall or the second wiper assembly 6 and the wiper 8 of the first wiper assembly 5. Both the fixed wall or the second wiper assembly 6 and the wiper 8 are extending a distance downwardly to provide the gathering unit for the marine organism when installed in the tank. The distance will vary as the bottom of the tank is not even. There may be brushes at the end of the wiper 8 or fixed wall to make sure that the assemblies 5, 6 reaches the bottom of the tank.

The first wiper assembly 5 may be hingedly connected to the hub 5a through for instance a bracket. This provides a possibility for the first wiper assembly 5 to adjust the position slightly in accordance with the outer shape of the tank. In this case the tank do not need to be fully circular and the wiper assembly do not need to follow an exactly radially path when moved.

The hinged connection makes it also possible to further restrict the area or space between the first wiper assembly 5 and the second wiper assembly 6. As indicted in FIG. 12, the first wiper assembly 5 and the second wiper assembly 6 is extending radially from the inner ring 4. This will leave a V-shaped gap in the area between the first wiper assembly 5 and the second wiper assembly 6. The hinged connection makes it possible to bring the first wiper assembly 5 and the second wiper assembly 6 closer together and thus restrict the collecting area 21.

Figure 13:
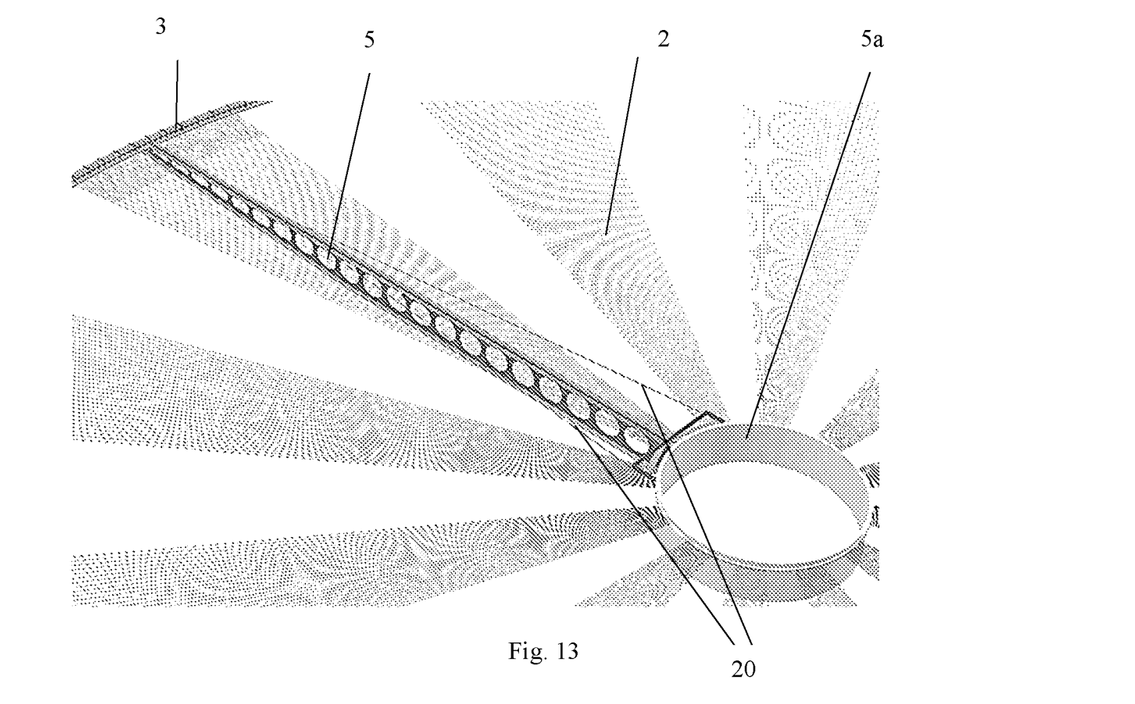
FIG. 13 shows the first wiper assembly with strut arrangement viewed from above.
Figure 14:
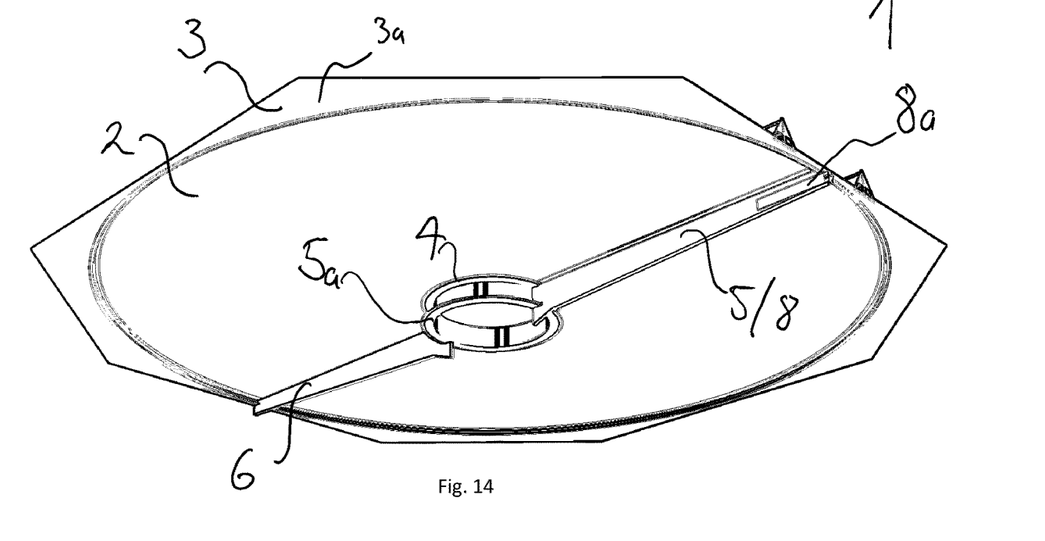
FIG. 14 shows an alternative embodiment of the crowding arrangement wherein the form of the outer ring is adapted to fit a non-circular tank shape.
Figure 15:
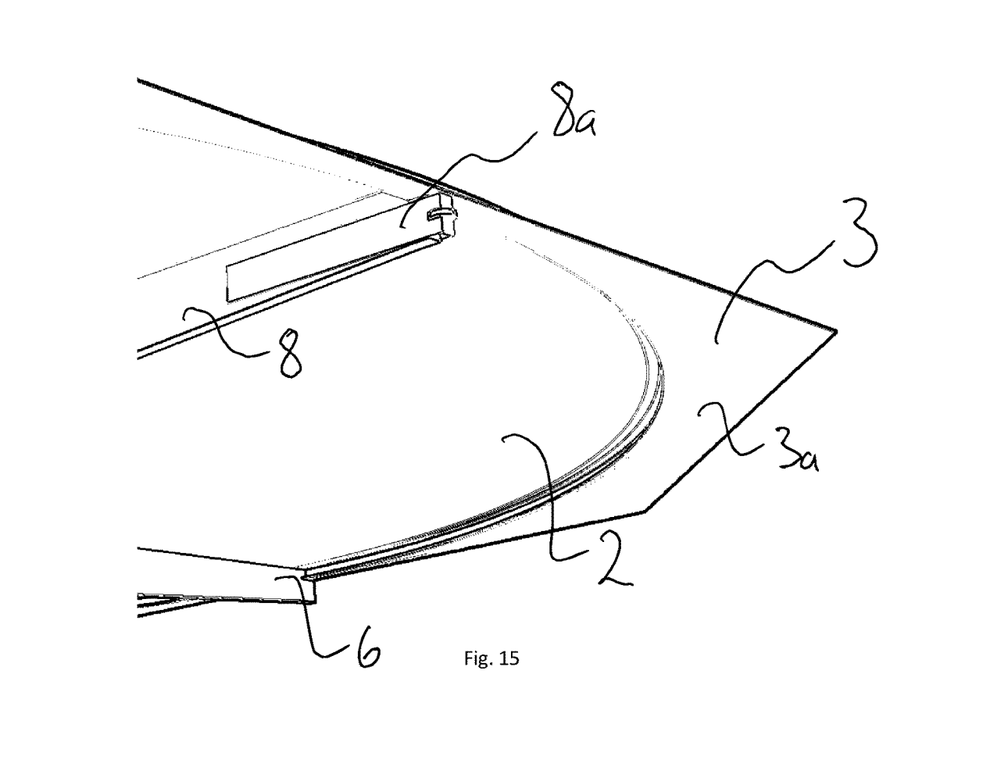
FIG. 15 shows the end of the wiper with a retracted wiper extender of the alternative embodiment of the crowding arrangement.

FIG. 13 shows the first wiper assembly 5 with a strut arrangement 20. The strut arrangement may be wires or similar extending between the longitudinal ends of the first wiper assembly 5 to keep the stability of the first wiper assembly 5.

Figure 12:
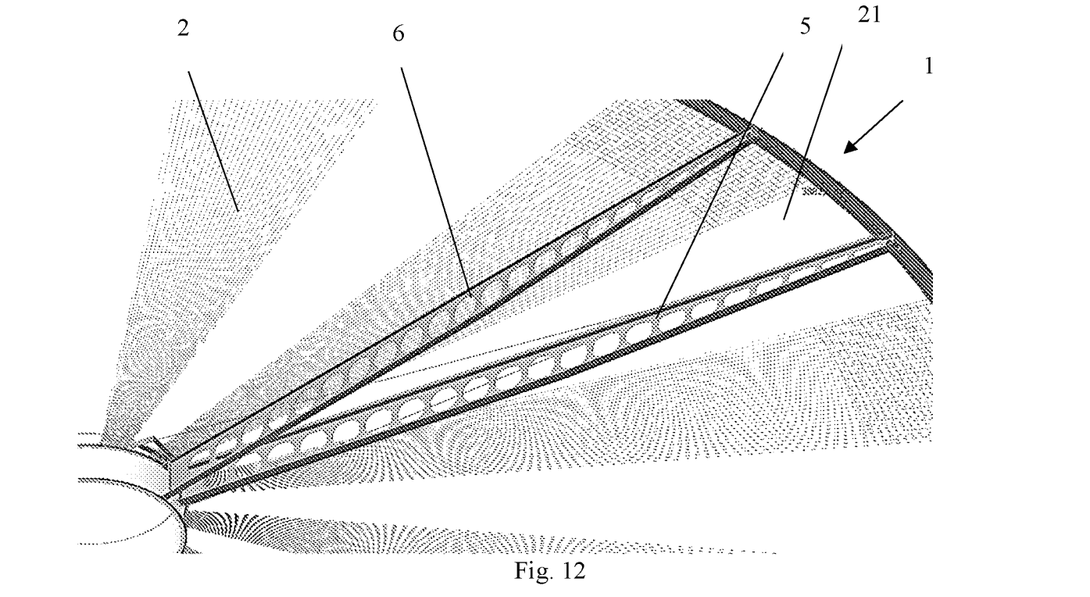
FIG. 12 shows an exemplary position of the first wiper assembly with respect to the counter bar, viewed from below.

FIG. 12 illustrates the crowding arrangement 1 viewed from the side facing the bottom of the tank, FIG. 13 shows a section of the crowding assembly 1 with the wiper assembly 5 viewed from above.

When in use, the crowding arrangement 1 is on the contrary arranged with the fixed wall or second wiper assembly 6, and the first wiper assembly 5 facing down in the tank.

The functioning of the invention will be further described below: The crowding arrangement 1 is installed in the so that the outer ring 3 of the crowding arrangement 1 mate with the inner wall surface 30 of the tank. This means that the crowding arrangement 1 fills out the cross-sectional area of the tank.

The crowding arrangement 1 may be lowered vertically into the tank along the central column 19, when present, in the middle of the tank. This may be performed by an external suspension arrangement that is arranged to lift the crowding arrangement in the vertical direction. The whole crowding arrangement 1 is lifted by the suspension arrangement. The suspension arrangement is preferably attached to both the hub 5a and the outer ring 3, to avoid any further dimensioning of the device when suspended.

The crowding arrangement 1 will prior to the gathering and crowding of the tank, be lowered towards the bottom of the tank so that the first wiper assembly 5 and the second wiper assembly 6 together with the bottom of the tank prevents the marine organisms to move out of the collecting area between the wiper 8 and the second wiper assembly 6.

The first wiper assembly 5 is then moved towards the second wiper assembly 6 by the driving mechanism 10 in order to make the collecting area 21 narrower. The outlet is arranged so that it will remain in the collecting area at all positions of the first wiper assembly 5. This results in that the marine organisms may be guided out from the collecting area 21 in an increasing number as the collecting area 21 decreases.

When the first wiper assembly 5 reaches the fixed wall or second wiper assembly 6 positioned on the hub 5a, as show in FIG. 13, the outer end of the fixed wall or second wiper assembly 6 may be moved towards the first wiper assembly 5 to further restrict the collecting area 21.

The first wiper assembly 5 and the fixed wall or second wiper assembly 6 are independently arranged. The first wiper assembly 5 is connected to the hub 5a and will follow the movement of the hub 5a. The second wiper assembly 6 or the fixed wall may on the other hand be connected to a horizontally arranged ring or several rings 4, 4b. The FIG. 10 shows two rings, where the upper ring is the same as the inner ring 4 connected to the sheet 2. In addition there may be a lower ring 4b. This is not further illustrated in the figures, but the rings may be arranged in groove(s) in the hub 5a. The hub 5a and the rings 4, 4b are slidingly arranged with respect to each other.

When the collecting area is emptied of marine organisms, the crowding arrangement may be moved vertically away from the bottom of the tank and the first wiper assembly 5 may be moved in the opposite direction to an initial position for repeated crowding of the tank.

FIGS. 14 to 18 illustrates an alternative embodiment of the crowding arrangement 1 intended for tank shapes that are substantially non-circular, such as tanks with corners, but not limited, e.g. oval, square, hexagonal or octagonal tanks, as shown in FIGS. 14 to 18. The crowding arrangement may however also be used with circular tanks.

In this alternative embodiment of the crowding arrangement 1, the outer ring 3 is formed in manner where it also covers all water surfaces between the inner wall surface 30 of the tank and the sheet 2 between inner ring 4 and the outer ring 3. This surface area of the outer ring 3 is designated as the outer ring first cover 3a. In this form the outer ring 3, and its outer ring first cover 3a, can cover tanks in other shapes, such as, but not limited to, rectangular or even triangular corners, or any non-circular tank available. So as shown in FIGS. 14 to 18, outer ring 3, and its outer ring first cover 3a is adapted to fit the shape of an octagonal tank.

The first wiper assembly 5 of this embodiment of the crowding arrangement 1, the wiper 8 rotates about the column 19 further includes a telescopic extension device 8a that is pushed towards the inner wall surface 30 of the tank as. The extension device 8a allow this embodiment of the crowding arrangement 1 to crowd marine organisms in non-circular tanks.

The extension device 8a is in constant contact with the inner wall surface 30 of the tank. The extension or retraction movement of the extension device 8a is done in a predetermined manner, by means of either or a combination of mechanical, pneumatic, hydraulic or electric means.

The extension device 8a is an elongated component and may be of similar construct as the wiper 8, or may be of simpler construct such as bar or a rod.

Figure 16:
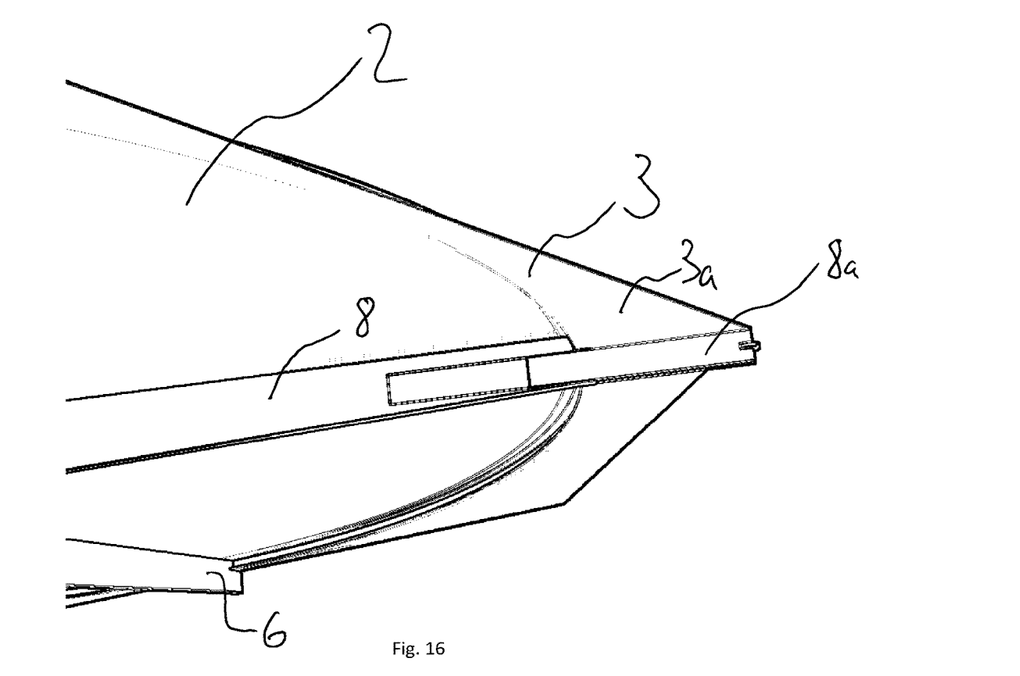
FIG. 16 shows the end of the wiper with an extracted wiper extender of the alternative embodiment of the crowding arrangement.
Figure 17:
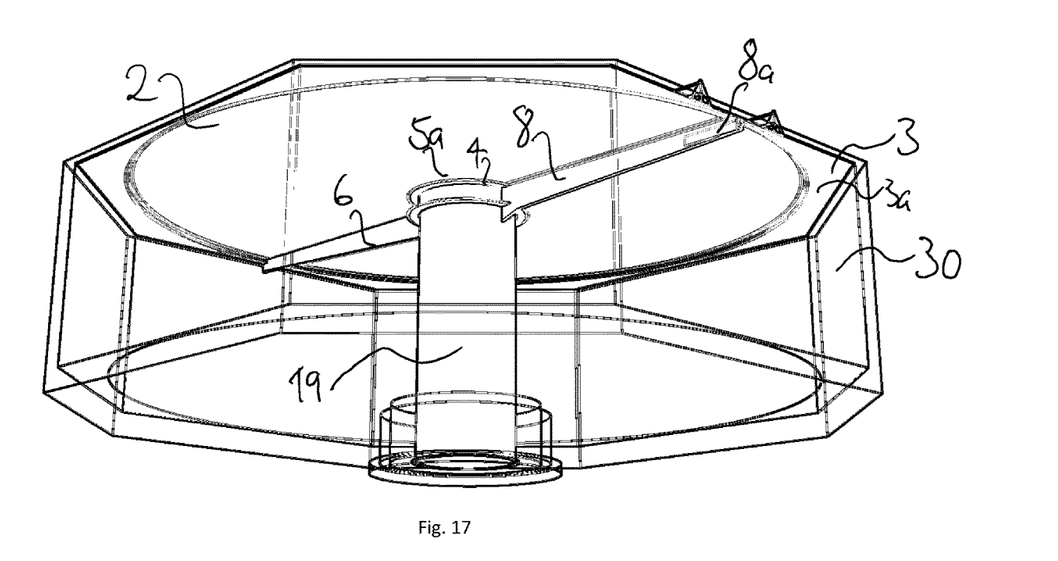
FIG. 17 shows of the alternative embodiment of the crowding arrangement in a transparent and perspective view before being lowered vertically in the tank.

The extension length of the extension device 8a is predetermined by the available shape of the tank, wherein the longest length of the extension device 8a is the furthest distance between the end of the wiper 8 and a corner of the tank. This is illustrated in FIG. 16, where the extension device 8a is in contact with a corner of the tank (the wall of the tank is not shown but follows the shape of the cover 3a).

As the extension device 8a is in contact with the inner wall surface 30 of the tank, the extension device 8a can include at its end a non-friction member, such as wheel or a ball-bearing, so not to damage the tank and its inner wall surface 30.

Figure 18:
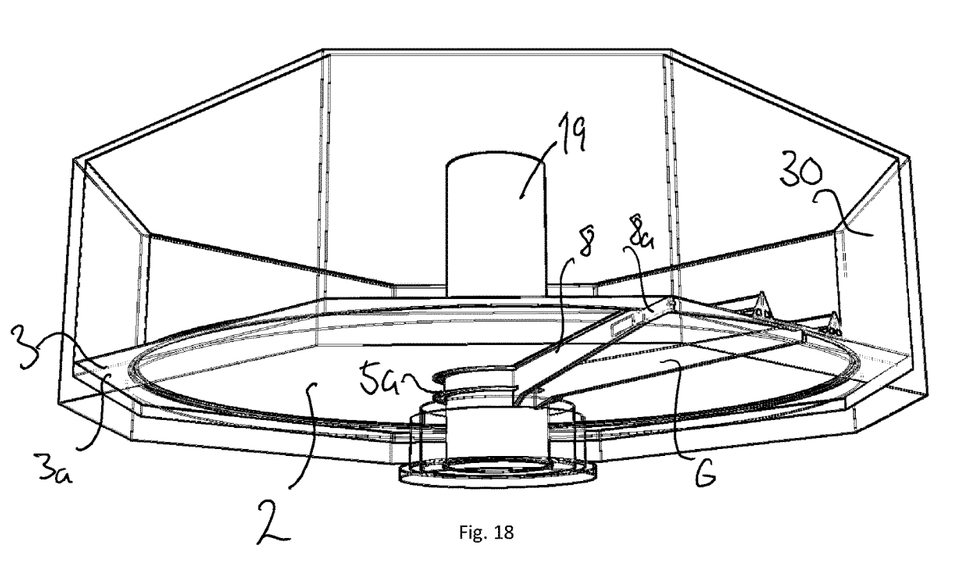
FIG. 18 shows of the alternative embodiment of the crowding arrangement in a transparent and perspective view near the bottom of the tank.

As shown in FIG. 18, the wiper 8 and the extension device 8a provide efficient crowding of marine organisms in non-circular tanks when the crowding arrangement 1 is positioned near the bottom of the tank. During crowding the first wiper assembly 5 rotates about the column 19, the wiper 8 crowds any marine organisms between the sheet 2 and the bottom of the tank and the extension device 8a crowds any marine organisms between the outer ring first cover 3a and the bottom of the tank.

FIGURE LIST

1—arrangement for crowding of a tank.
2—sheet
3—outer ring
3a—outer ring first cover
3b—outer second ring cover
4—inner ring
4b—additional inner ring
5—first wiper assembly
5a—hub
5b—hinged connection
6—second wiper assembly or fixed wall
6b—second wiper assembly openings
7—crossbar
8—wiper
8b—wiper openings
9—guide arrangement
10—driving mechanism
11—bar
12—pulling device, such as a rope/wire 13—inner guide wall
14—outer guide wall
15a—track
15b—slit
16—bar guide
17—crossbar roller
18—wiper block
19—silo/central column
20—strut arrangement
21—collecting area/space
30—inner wall surface of the tank
A center axis crowding arrangement
B—center axis hinged connection

The invention claimed is:

1. A crowding arrangement for an aquaculture tank of marine organism, the tank having at least one outlet in a bottom of the tank, wherein the crowding arrangement comprises:
 a sheet extending between a hub and an outer ring wherein the sheet encircles the hub and the outer ring is in contact with an inner wall surface of the tank;
 wherein the hub is located at a center of the tank;
 wherein the sheet, the hub and the outer ring covers a horizontal cross-sectional area of the tank;
 a first wiper assembly and either a second wiper assembly or a fixed wall, extending substantially radially between the hub and the outer ring;
 wherein the first wiper assembly is moveably arranged with respect to the sheet;
 wherein the first wiper assembly comprises:
  a crossbar and a wiper ;
  wherein the crossbar and the wiper are arranged in parallel and that a gap is formed therebetween to receive the sheet;
  wherein the wiper and the crossbar are fixedly attached to each other at one end; and
  wherein the gap between the wiper and the crossbar are small enough to prevent a marine organism to pass through the gap.

2. The crowding arrangement according to claim 1, wherein the hub further comprises:
 an inner ring;
 wherein the sheet encircles the inner ring and the sheet extends between the inner ring and the outer ring.

3. The crowding arrangement according to claim 1, wherein the gap have a predetermined size for preventing marine organisms of passing through the gap;
 wherein the predetermined size for preventing marine organisms has a diameter of about 0.1 cm to 5.0 cm.

4. The crowding arrangement according to claim 1, wherein the wiper extends downwardly towards a tank bottom when installed in the tank.

5. The crowding arrangement according to claim 1, wherein the first wiper assembly further includes comprises:
 an extension device;
 wherein the extension device extends from an end of the wiper and towards the inner wall surface of the tank for crowding marine organisms between the outer ring and the bottom of the tank.

6. The crowding arrangement according to claim 1, wherein the crowding arrangement further comprises:
 a driving mechanism;
 wherein the driving mechanism is adapted to rotate the first wiper assembly around a centre axis of the crowding arrangement.

7. The crowding arrangement according to claim 6, wherein the driving mechanism is arranged in the outer ring of the crowding arrangement.

8. The crowding arrangement according to claim 6, wherein the driving mechanism further comprises:
 a pulling device attached to the driving mechanism to facilitate the movement of the wiper assembly.

9. The crowding arrangement according to claim 7, wherein the wiper is attached to a bar through a wiper block.

10. The crowding arrangement according to claim 9, wherein the wiper block is adapted to be moved along a slit between an outer guide wall and an inner guide wall.

11. The crowding arrangement according to claim 1, wherein the first wiper assembly is hingedly connected to the hub.

12. A method for crowding an aquaculture tank of marine organism, comprises the steps:
 utilizing a crowding arrangement comprising:
  a sheet extending between a hub and an outer ring;
  wherein the sheet encircles the hub and the outer ring is in contact with an inner wall surface of the tank;
  wherein the hub is located at a center of the tank;
  wherein the sheet, the hub and the outer ring covers a horizontal cross-sectional area of the tank;
 a first wiper assembly and either a second wiper assembly or a fixed wall, extending substantially radially between the hub and the outer ring;
  wherein the first wiper assembly is moveably arranged with respect to the sheet;
  wherein the first wiper assembly comprises:
   a crossbar and a wiper;
   wherein the crossbar and the wiper are arranged in parallel and that a gap is formed therebetween to receive the sheet;
   wherein the wiper and the crossbar are fixedly attached to each other at one end;
   wherein the gap between the wiper and the crossbar are small enough to prevent a marine organism to pass through the gap; and
 rotating the first wiper assembly towards the second wiper assembly or the fixed wall to guide the marine organism towards an outlet in the tank positioned at the bottom of the tank, the outlet being positioned so that in all positions of the wiper assembly the outlet is arranged in the area between the second wiper assembly or the fixed wall, and the first wiper assembly.

* * * * *